United States Patent [19]

Raymond

[11] Patent Number: 5,650,482
[45] Date of Patent: Jul. 22, 1997

[54] ADHESION PROMOTERS

[75] Inventor: William René Éduard Raymond, Kreuzau-Leversbach, Germany

[73] Assignee: Air Products and Chemicals, Inc., Allentown, Pa.

[21] Appl. No.: 492,128

[22] PCT Filed: Feb. 7, 1994

[86] PCT No.: PCT/EP94/00349

§ 371 Date: Sep. 27, 1995

§ 102(e) Date: Sep. 27, 1995

[87] PCT Pub. No.: WO94/18261

PCT Pub. Date: Aug. 18, 1994

[30] Foreign Application Priority Data

Feb. 10, 1993 [EP] European Pat. Off. ............ 93200359

[51] Int. Cl.$^6$ .................... C08G 69/34; C08G 69/40
[52] U.S. Cl. .................... 528/310; 528/312; 528/317; 528/319; 528/322; 528/329.1; 528/335; 528/336; 528/339.5; 524/606
[58] Field of Search ..................... 528/335, 336, 528/339.5, 310, 312, 317, 319, 322, 329.1; 524/606

[56] References Cited

U.S. PATENT DOCUMENTS 4,146,520  3/1979  Bierwirth et al. ............... 524/100
4,717,746  1/1988  Leoni et al. ..................... 524/100

FOREIGN PATENT DOCUMENTS 0171850  2/1986  European Pat. Off. .
0378205  7/1990  European Pat. Off. .
2073224  10/1986  United Kingdom .

OTHER PUBLICATIONS

Ullman's Encyclopadie der technischen Chemie 3rd Ed. (Munchen–Berlin: Urban & Schwarzenberg Verlag, 1963) vol. 14, pp. 73–75.

Primary Examiner—James J. Seidleck
Assistant Examiner—P. Hampton-Hightower
Attorney, Agent, or Firm—Michael Leach; William F. Marsh

[57] ABSTRACT

An at least two-step process for the preparation of polyamide resins wherein, in the first step, polyvalent carboxylic acids, optionally together with monovalent carboxylic acids, are reacted with a stoichiometric deficiency of polyamines in the presence of an organic solvent which forms an azeotrope with water, water is distilled off, and the reaction is controlled by means of the amount of water formed by the condensation reaction and, optionally, by the imidazoline formation. After removal of the theoretical amount of water or a lesser amount, in a further step more amine is added to the reaction mixture in an amount sufficient to achieve a final amine number of 10 to 300 mgKOH/g, the reaction is continued, substantially all of the residual water is removed, and the residual solvent is completely or partially removed.

20 Claims, No Drawings

ADHESION PROMOTERS

FIELD OF THE INVENTION

The invention relates to polyamide resins based on organic acids, e.g., mixtures of monomeric, dimeric, and trimeric fatty acids, and amines, which can be used for, among other things, as adhesion promoters for polymers and copolymers, more particularly for polymers and copolymers of vinyl chloride, to a process for preparing such resins, and to their use as adhesion promoters.

BACKGROUND OF THE INVENTION

Polyamide resins of the aforementioned type have long been known. For instance, Ullmann's *Encyklopädie der technischen Chemie*, 3rd Ed. (München-Berlin: Urban & Schwarzenberg Verlag, 1963) in Vol. 14, pp. 73–75 describes polyamide resins which are prepared from amines such as ethylene diamine and other polyethylene amines and branched dicarboxylic acids made from unsaturated fatty acids. The use of trimeric fatty acids and monomeric or trimeric carboxylic acids for the composition of such polyamide resins is also mentioned.

Mentioned as fields of application for these polyamides, which are of a waxy or resinous character, are, among other applications, the curing of epoxide resins, the bonding of raw materials, the manufacture of composite component parts, and the like.

Polyamide resins find a further field of application as adhesion promoters, especially in so-called plastisols. These are liquid to pasty dispersions of a powdery polymerisate in a plasticiser.

Plastisols are used, for example, for heat- and sound-insulating layers, for protection against corrosion and stoning (damage caused to coated bodies by stones or pebbles impacting on their surface), which in this case are principally applied in the construction of automobiles by means of application onto various kinds of metal surfaces. While plastisols can display certain adhesive properties, these do not always comply with the today's high requirements. For there is insufficient adhesion in certain places after application of the protective layer or if the adhesion loosens in due course, corrosion may set in very rapidly. Also in the case of mechanical stress the protective layer may come off.

So far, there has been no lack of attempts to improve the various polyamide resins in order to adapt them for certain applications. The objective of this development work has been the improvement of polyamide resins for their use as adhesion improvers or adhesion promoters, with regard to their adhesive properties, processability, intake of water, storage stability, and their resistance to high temperatures, light, and radiation.

This has already been attempted and accordingly, German Patent Specification 3 111 815 describes the improvement of the adhesive properties of plastisols by condensing 0 to 0.5 equivalents of certain polycarboxylic acids originating from the polymerisation of unsaturated fatty acids and 0.5 to 1 equivalents of dicarboxylic acids such as adipic acid with 1 to 2 equivalents of particular aliphatic polyamines. However, the thermal stability of these plastisols still leaves something to be desired.

SUMMARY OF THE INVENTION

European Patent Application 171 850 describes the improvement of the thermal stability of a plastisol by the addition of polyamide resins based on the condensation of 1.0 to 2.2 equivalents of an heterocyclic polyamine such as piperazine or N-aminoethyl piperazine with a polycarboxylic acid. The process described in this application is difficult to control and frequently leads to very high molecular weight polymers which are not suitable for further processing. It is also often impossible to bring the condensation to a conclusion because the viscosity increases so rapidly during the reaction that the mixture is no longer stirrable leading to premature stoppage of the reaction.

The process described in European Patent Application 378 205 behaves in the same way.

A further drawback to the above-mentioned processes is that the improvements always go more or less in one direction, and that, for instance, the improvement in thermal stability is achieved at the expense of a deterioration of the processability.

Although numerous processes are already known which describe the manufacture of polyamide resins which can also be used as adhesion promoters, there is still a need for improved processes yielding products with enhanced properties which can be applied in various fields of application.

Consequently the object of the invention is to provide a process which is easy to carry out, can be controlled properly and yields reproducible products which display favourable properties of adhesion, resistance to the action of heat and light and a low intake of water. The invention also has the objective of providing a process which permits the selective adjustment of one or more specific properties, thus enabling the manufacture of custom-made products for varied application purposes and processing conditions. Additional advantages of the invention follow in the remaining description and examples.

The objective is reached by a process for the preparation of polyamide resins having an amine number of 10 to 300 mgKOH/g. The process entails the reaction of amines with carboxylic acids in a multi-step process, characterized by, in a process with at least two-steps, a first step where polyvalent carboxylic acids, optionally together with monovalent carboxylic acids, are reacted with a stoichiometric deficiency of polyamines. The reaction is carried out in the presence of an organic solvent which can form an azeotrope with water and is therefore used to remove the reaction water. The reaction is controlled by means of the amount of water collected from the condensation, and possibly from the formation of imidazoline. After removal of the theoretical or a lesser amount of water, in a second step an amount of amine sufficient to achieve a final amine number of 10 to 300 mgKOH/g is added to the reaction mixture. The reaction is continued until no more water can be collected. After which time the residual water is removed with all or some part of the solvent. Preferably the amines are used in an amount leading to a final amine number of 100 to 160 mgKOH/g. It is especially advantageous to add the amines in such an amount that in the final step all the carboxylic acid groups will have been reacted. In the first step, preference is given to use of a single amine.

It is advantageous when, after the first step and prior to the further step, an additional amine is added in a second step. The reaction is continued in a similar way to the first step, removing the water produced. Preferably, in the first step a mixture of dimeric and trimeric carboxylic fatty acids is used, optionally containing some monomeric carboxylic fatty acid and/or dicarboxylic acid.

DETAILED DESCRIPTION OF THE INVENTION

Especially suitable for the first step are one or more amines such as polyalkylene amines, more particularly polyethylene amines of the $H(NH-CH_2CH_2)_x-NH_2$ type. Instead of the ethylene radical there may be another divalent aliphatic, cycloaliphatic, aromatic, arylaliphatic, heterocyclic, or hetero-atom interrupted aliphatic radical. Each hydrogen atom on the terminal amino groups may be replaced with corresponding substituents, e.g., of an aliphatic nature.

Also highly suitable as amine for the first step are piperazines, N-aminoethyl piperazine, and amines derived from piperazines of the following formulae:

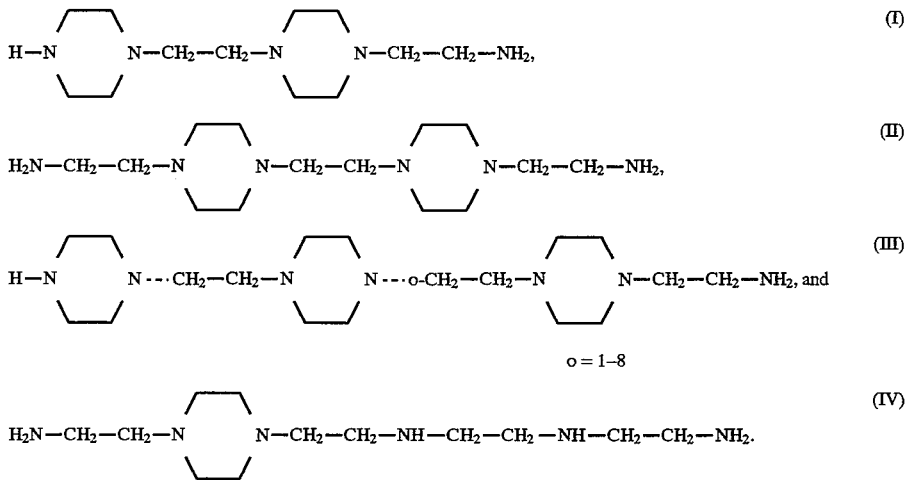

The following polyamines, without restriction or limitation, are particularly suitable for use in the first step:

1,2-ethane diamine;
1,3-propane diamine;
1,2-propane diamine;
1,3-pentane diamine;
3-azapentane-1,5-diamine;
3,6-diazaoctane-1,8-diamine;
3,6,9-triazaundecane-1,11-diamine;
3,6,9,12-tetradecane-1,14-diamine;
3-azahexane-1,6-diamine;
4-azaheptane-1,7-diamine;
4,7-diazadecane-1,10-diamine;
3-amino-1-methyl aminopropane;
3-amino-1-cyclohexyl aminopropane;
neopentane diamine;
1,6-hexane diamine;
1,8-octane diamine;
2,2,4-trimethyl hexamethylene diamine;
2,4,4-trimethyl hexamethylene diamine;
4,9-dioxadodecane-1,12-diamine;
4,7,10-trioxatridecane-1,13-diamine;
4,4'-diaminodicyclohexyl methane;
3,3'-dimethyl-4,4-diaminodicyclohexyl methane;
3-aminomethyl-3,5,5-trimethyl cyclohexyl amine;
1,2-diaminocyclohexane;
1,3-bis(amine methyl)cyclohexane;
4,4'-diaminodiphenyl methane;
m-phenylene diamine;
diethyl toluene diamine;
m-xylylene diamine;
Jeffamine® D-230;
Jeffamine® D-400;
Jeffamine® D-2000;
Jeffamine® ED 600;
Jeffamine® ED-900 and;
Jeffamine® T-403.

The following compounds, without restriction or limitation, are considered suitable monoamines for the further step, i.e., the final step:

dimethyl aminopropyl amine;
Duomeen® CD ($R-NH-CH_2-CH_2-NH_2$);
Armeen® (ex. AKZO Chemicals fatty amines);
hexyl amine;
octyl amine;
dibutyl amine;
di-2-methoxyethyl amine;
3-ethoxy-1-propane amine;
cyclohexyl amine;
Jeffamines® are commercial products of Texaco Chemical Company.

In the further and/or, optional, second step, use is advantageously made of di- or polyfunctional amines having amine functions of varying reactivity. For the second and/or third step monoamines may be used or co-used.

In a particularly favourable embodiment of the process according to the invention a plasticiser is added during the further (final) step following the removal of the residual water. Especially suitable as plasticisers for this purpose are benzyl alcohol, dioctyl phthalate, diisopropyl phthalate, dibutyl ether, diisopropyl naphthalene, and mixtures thereof.

Especially suitable as solvents forming an azeotrope with water are, according to the invention, toluene and/or xylene as well as dibutyl ether.

Further embodiments of the invention are constituted by polyamide resins which can be obtained according to any one of the aforementioned processes, and their use as adhesion promoters.

The process according to the invention may be carried out as indicated below. The polyvalent carboxylic acids to be condensed, and which may be obtained from, for example, polymerisation of unsaturated fatty acids, are dissolved or dispersed in a solvent forming an azeotrope with water. These carboxylic acids are composed primarily of dimers and trimers which can be obtained via the polymerisation of unsaturated fatty acids. In addition, monomeric fatty acids may be present in the mixture. It is also possible to add saturated monocarboxylic acids as well as dicarboxylic acids not obtained via the polymerisation of fatty acids, e.g., adipic acid.

The carboxylic acids which may be employed are mainly commercially available products. The preferred carboxylic acids are the so-called polymerised fatty acids which are obtained from unsaturated fatty 0acids. Further details regarding such acids can be found in, for example, EP-A-0 084 111, notably on pages 6 and 7, which disclosure is specifically referred to here.

Polyamines are then added in stoichiometric deficiency to a solution or dispersion of the polymerized fatty acids. By stoichiometric deficiency is meant that per equivalent of carboxyl groups of the acids, less than one equivalent of reactive amine groups is added. Favourable ratios are, for example, 0.3 to 0.8 equivalents of reactive amine groups per equivalent of carboxyl groups. Reactive amine groups are those amine groups which are able to condense or polycondense with carboxyl groups. For diamines such as ethylene diamine or piperazine these are the two primary or, alternatively the secondary amine groups. In the case of polyamines containing more than two amine groups such as polyethylene polyamines, e.g., diethylene triamine, triethylene tetramine, only the two primary amine groups are considered to be reactive amine groups.

In the first step, the "backbone" of the polyamide resin is formed. This building up of the backbone may be continued in the steps preceding the last (further) step, if desired. Preferably, diamines are employed in the first step. Although it is possible to use diamines having varying amine functionalities, such as N-aminoethyl piperazine, amines with two equivalent amine functionalities are the most suitable for the first step, in particular those amines of the formulae I and/or II.

The appropriate amines are without exception, commercially available products. Examples of amines which may be used within the framework of the invention are to be found in, for example, EP-A-0 098 372, more particularly on pages 6 and 7, which disclosure is specifically referred to here. Also suitable are the Jeffamines®.

By selecting the acids, the ratio of dimers and trimers and optional monomers, when present, and the amine, it is possible according to the invention to build up a polyamide resin backbone having a wide range of tailored properties. Thus, the adhesion properties may be varied via the proportion of trimeric acids, while the use of piperazine or N-aminoethylpiperazine will influence the thermal stability.

The reaction is carried out at elevated reaction temperature, which will be generally at a level of at least 120° C. The required temperature can be influenced by the use of a solvent, the reactant concentration, and the pressure. If a certain amount of imidazoline formation is required, the temperature must be raised since, generally, imidazoline formation takes place at higher temperatures than amide formation.

The water which forms during the reaction is removed by means of azeotropic distillation. The amount of outgoing water is measured and more amine is added in a further step when the desired amount of water has been separated. This may be the theoretical amount corresponding to, for example, 0.8 equivalents of reactive groups employed, or, alternatively, a lesser amount. The desired amount of water to be removed can be calculated in advance and corresponds to the amount of water which is released by the condensation of the amine and the carboxyl groups to form the amide groups and, when required, from the formation of imidazoline.

Advantageously, in the further step and, when desirable, in the intervening second step, amines are introduced which are comprised completely or in part of amines having amine functions of varying reactivity, e.g., N-aminoethyl piperazine. Alternatively, at this stage it is possible to use monoamines or polyamines, such as dimethyl aminopropyl amine, which having only one primary amine group and a tertiary amine group will behave like a monoamine.

The further, i.e., final step, which is the second step in a two-step process, or the third step in a three-step process, etc., serves to continue and conclude the condensation process and, above all, to determine the final amine number which is of major importance to the goal of the application. It also plays an important role in the use of polyamide resin as an adhesion promoter by influencing the processability and thermal stability of the compound, which, besides the polymer such as PVC, and the plasticiser, also contains various other ingredients, such as pigments, calcium carbonate, additives, etc.

The final step also serves to react, quantitatively if possible, the remaining carboxyl groups. Preferably, the entire amount of the amines used in the various steps is so chosen as to give precisely enough amine groups to react all the carboxyl groups in the reaction mixture which are derived from carboxylic acids.

In the preparation of polyamide resins according to the invention, which resins are intended to be used as adhesion promoters in plastisols, it is above all of advantage to add a plasticiser in the further (final) step after removal of the residual water and partial or complete removal of the solvent. This facilitates the further processing of the adhesion promoter in the plastisols. If desired, there may be added in addition to, or instead of, plasticisers, other substances which may be relevant to the further processing of the material, e.g., white spirit.

Although here mention is generally made of two steps, i.e., the first and the further step, or of three steps, i.e., the first, the second, and the further step, it is also possible according to the invention to carry out the preparative process in more than three steps. For instance, the first step can also be carried out in several sub-steps, and the same goes for the other steps.

It is particularly surprising that the process according to the invention permits the selective preparation of polyamide resins having a wide range of uses and possessing excellent properties. The preparative process is readily controllable and the highly undesirable gel formation, which occurs when the condensation gets out of control and which leads to useless waste, does not arise. Properties such as viscosity and processability can be carefully regulated, as can the chemical composition, so that polyamide resins having a particular property profile can be selectively prepared.

In practice, it has been shown to be scarcely possible to prepare a "universal" adhesion promoter. Thus, for instance, in the automobile industry the type of sheet metal used, the type of dip coating, etc. have an effect on the serviceability of a compound whose properties and processability will be greatly affected by the adhesion promoter. The process according to the invention offers a method which permits a flexible approach to even the most varied customer wishes and to successful optimization of property profiles.

Furthermore, the polyamide resins according to the invention may be employed as curing agents for epoxide resins and isocyanates, as well as in fields where polyamide resins are commonly used.

The invention will be further illustrated with reference to the following examples.

EXAMPLE 1

Preparation of a polyamide resin which may be used as an adhesion promoter for plastisols, in a two-step process. Acid/1st amine/2nd amine equivalency ratio=21/12/9.

Into a 700 ml glass reactor equipped with a corresponding flanged head, an electrically driven stirrer, a thermometer, and a Dean-Stark water trap were charged 171 g of Pripol 1040 (0.6 equivalents). Pripol is a polymerised fatty acid essentially composed of about 80% of trimers and about 20% of dimers. Also 150 g of xylene were added.

The mixture was stirred and simultaneously heated to 100° C. Within 5 minutes 14.8 g of piperazine (0.344 equivalents) were added, with the temperature rising to about 112° C. After that, the temperature was raised until refluxing started and the reaction continued until 6.2 g (0.344 equivalents) of water had been removed; about 6 hours were needed to accomplish this.

The mixture was then cooled to 120° C., and within 10 minutes 33.2 g (0.2574 equivalents) of N-aminoethyl piperazine were added. The mixture was again heated until refluxing started and the reaction continued until 4.5 g (0.2500 equivalents) of water had been removed (the theoretical value was 4.6 g).

After that, the mixture was cooled to 120° C. The Dean-Stark water trap was replaced by a distillation head, the pressure was reduced to 20 mbar, and xylene and the residual amount of water were removed, in which process a maximum temperature of about 160° to 170° C. was reached in the reactor.

When there was no longer any distillate being distilled, the mixture was cooled to 120° C. under vacuum prior to being subjected to standard pressure again. After that, 208.6 g of diisopropyl naphthalene were added in order to reduce the viscosity and improve the processability.

Obtained were 417 g of a deep-brown liquid. Analysis of this product produced the following values:

amine number: 82 mg KOH/g (perchloric acid method)
viscosity at 20° C.: 89.4 Pa.s Pripol 1040 is a commercial product ex Unichema Chemie GmbH, D 4240 Emmerich.

EXAMPLE 2 to 8

In the same manner Pripol 1040 was reacted with different amines in a two-step process.

The further details can be taken from Table I.

TABLE I

| Example | 2 | 3 | 4 | 5 | 6 | 7 | 8 |
|---|---|---|---|---|---|---|---|
| equivalency ratio | 12/6/6 | 12/6/6 | 12/6/6 | 12/6/6 | 21/12/9 | 42/26/16 | 12/6/6 |
| Pripol 1040 (g) | 171.0 | 171.0 | 171.0 | 171.0 | 171.0 | 171.0 | 171.0 |
| 1. amine | | | | | | | |
| TETA | — | 22.5 | — | — | — | — | — |
| TEPA | — | — | 33.0 | — | — | — | — |
| N-AEP | 19.4 | — | — | 19.4 | — | — | 19.4 |
| PIP | — | — | — | — | 14.8 | 16.0 | — |
| separated water (theor.) | 5.1(5.4) | 5.7(5.4) | 5.5(5.4) | 5.2(5.4) | 6.0(6.2) | 6.6(6.7) | 5.2(5.4) |
| 2. amine | | | | | | | |
| N-AEP | 38.8 | 38.8 | 38.8 | 38.8 | — | — | — |
| AEEA | — | — | — | — | 26.8 | — | 31.2 |
| DMAPA | — | — | — | — | — | 24.5 | — |
| separated water (theor.) | 5.1(5.4) | 8.1(5.4) | 9.6(5.4) | 5.1(5.4) | 8.4(4.6) | 4.1(4.3) | 8.2(5.4) |
| plasticiser diisopropyl naphthalene | - | 218.5 | 227.7 | 218.9 | 100.0 | 100.0 | 100.0 |
| benzyl alcohol | - | - | - | - | 98.2 | 100.8 | 108.2 |
| di-octyl phthalate | 219.0 | - | - | - | - | - | - |
| amine no. (mg KOH/g) | 99 | 119 | 136 | 101 | 53 | 57 | 68 |
| viscosity at 20° C. (Pa.s) | | 32.8 | | 37.2 | 8.6 | 4.3 | 7.5 |
| active product | 50 | 50 | 50 | 50 | 50 | 50 | 50 |

EXAMPLE 9

Preparation of a polyamide resin which may be used as an adhesion promoter for plastisols, in a 3-step process. Acid/1st amine/2nd amine/3rd amine equivalency ratio=21/12/4/5.

Into a 700 ml glass reactor equipped in the same manner as that employed in Example 1 were charged 171.0 g (0.6 equivalents) of Pripol 1040. Also added were 150 g of xylene, and the whole was mixed through stirring and heated to 100° C. Within 5 minutes 25.7 g (0.345 equivalents) of TETA were added, with the temperature rising to 113.6° C. After that, the temperature was raised until refluxing started (139° to 141° C.). The reaction was continued until 6.4 g of water had been removed. This took about 40 minutes. The mixture was then cooled to 120° C.

Within 10 minutes 30.9 g (0.114 equivalents) of Duomeen CD (a fatty amine produced by Akzo Chemicals GmbH, Düren) were added. The mixture was again heated until refluxing started (152° to 154° C.). It was then kept under reflux for 6 hours, until 2.1 g of water had been removed. The mixture was then cooled to 120° C. After that, 18.4 g (0.143 equivalents) of N-aminoethyl piperazine were added within 10 minutes. The reaction was continued until all of the water had been removed. This final step required about 4 hours, with 6.5 g of water being removed in the process. The increased amount as compared with the theoretical value (2.6 g) has its origins in the imidazoline formation.

After that, the mixture was cooled to 120° C. Xylene and residual water were removed in the same manner as in Example 1. 231.2 g of diisopropyl naphthalene were added in order to improve the viscosity and the processability. Obtained were 462 g of a deep-red product. The product had the following properties:

amine number: 97 mg KOH/g (perchloric acid method)
viscosity at 20° C.: 33.1 Pa.s

EXAMPLES 10 to 15

In the same manner Pripol 1040 was reacted with different amines in a 3-step process.

The further details can be taken from Table II.

TABLE II

| Example | 10 | 11 | 12 | 13 | 14 | 15 |
|---|---|---|---|---|---|---|
| equivalency ratio | 21/12/7/2 | 12/4//2/6 | 12/4/6 | 12/4//2/6 | 12/2/4/6 | 12/4/2/6 |
| Pripol 1040 (g) | 171.0 | 171.0 | 171.0 | 171.0 | 171.0 | 171.0 |
| solvent | xylene | toluene | xylene | xylene | xylene | xylene |
| 1. amine | | | | | | |
| PIP | 14.8 | — | 8.9 | 8.9 | 8.9 | 8.9 |
| TETA | — | 15 | — | — | — | — |
| separated water (theor.) | 6.1(6.2) | 3.7(3.6) | 3.5(3.7) | 3.5(3.7) | 3.5(3.7) | 3.5(3.7) |
| 2. amine | | | | | | |
| AEEA | 20.8 | — | — | — | — | — |
| PIP | — | 4.3 | — | — | — | — |
| Jeffamine D-400 | — | — | 20.0 | — | — | — |
| Jeffamine ED-900 | — | — | — | 49.0 | — | — |
| TETA | — | — | — | — | 7.5 | — |
| separated water (theor.) | 4.4(3.6) | 1.8(1.8) | 1.6(1.8) | 1.7(1.9) | 3.1(1.8) | 17(1.8) |
| 3. amine | | | | | | |
| N-AEP | 7.8 | 38.7 | 38.7 | 38.7 | — | 38.7 |
| Duomeen CD | — | — | — | — | 84.0 | — |
| separated water (theor.) | 3.2(1.1) | 5.7(5.4) | 5.0(5.4) | 5.5(5.4) | 5.4(5.4) | 5.4(5.4) |
| plasticiser diisopropyl naphthalene | 200.7 | 216.4 | 228.5 | 256.9 | 259.4 | 219.5 |
| amine no. (mg KOH/g) | 60 | 103 | 72 | 63 | 63 | 88 |
| viscosity at 20° C. (Pa.s) | 13.3 | 112 | 27.3 | 17.6 | 5.1 | 24.3 |
| active product | 50 | 50 | 50 | 50 | 50 | 50 |

EXAMPLE 16 to 17

In the same manner as described in Example 1 Pripol® 1017 (about 80% of dimer and 20% of trimer) was used instead of Pripol® 1040. Further details can be taken from Table III.

TABLE III

| Example | 16 | 17 |
|---|---|---|
| equivalency ratio | 20/18/2 | 20/18/2 |
| Pripol 1017 (g) | 171.0 | 171.0 |
| 1. amine | | |
| TETA | 40.5 | — |
| PEHA | — | 72.6 |
| separated water (theor.) | 9.5(9.7) | 10.1(9.7) |
| 2. amine | | |
| N-AEP | 7.7 | 7.7 |
| separated water (theor.) | 6.2(1.1) | 5.3(1.1) |
| plasticiser diisopropyl naphthalene | 203.5 | 235.9 |
| result amine no. (mg KOH/g) at 20° C. (Pa.s) | 94.7 | 156 |
| viscosity at 20° C. (Pa.s) | 32 | 85 |

TABLE III-continued

| Example | 16 | 17 |
| --- | --- | --- |
| active product | 50 | 50 |
| % imidazoline | ca. 53 | ca. 53 |

Explanation of the abbreviations used in the examples:
Jeffamine D-400 polyoxypropylene diamine with an average molecular weight of 400
N-AEP N-aminoethyl piperazine
DETA diethylene triamine
TETA triethylene tetramine
TEPA tetraethylene pentamine
PEHA pentaethylene hexamine
NN-DAPP 1,4-bis(3-aminopropyl)piperazine
Amine N4 linear polyamine ex BASF
DMAPA dimethyl aminopropyl amine
P-101 phenyl glycidyl ether/DETA adduct product of Akzo Chemicals GmbH Düren
Laromine C252 product of BASF - cycloaliphatic diamine
Duomeen CD AKZO product - fatty polyamine
RV 1805 product of Ems Chemie o-cresyl glycidyl ether
GE glycidyl ether
KMC non-reactive diluent
DOP di-octyl phthalate
BZA benzyl alcohol

I claim:

1. A process for the preparation of polyamide resins having an amine number of 10 to 300 mgKOH/g which comprises reacting amines with carboxylic acids in a multi-step process, wherein the first step of the process comprises reacting one or more polyvalent carboxylic acids or a mixture of one or more polyvalent carboxylic acids and one or more monovalent carboxylic acids, with a stoichiometric deficiency of one or more polyamines in the presence of an organic solvent which forms an azeotrope with water, distilling water off, and controlling the reaction by means of the amount of water formed by the condensation reaction and, optionally, by the imidazoline formation, and, after removal of the theoretical amount of water or a lesser amount, in a further step, adding additional amine to the reaction mixture in an amount sufficient to achieve a final amine number of 10 to 300 mgKOH/g, continuing the reaction until substantially all of the residual water is removed, and completely or partially removing any residual organic solvent.

2. The process of claim 1 wherein the total amount of amines employed is sufficient to obtain an amine number of 100 to 160 mgKOH/g.

3. The process of claim 1 wherein the total amount of amines employed is sufficient to cause all of the carboxyl groups of said carboxylic acids to be reacted.

4. The process of claim 1 wherein a single polyamine is employed in the first step.

5. The process of claim 1 which additionally comprises a second step after the first and prior to the further step, wherein additional amine is added in said second step and the reaction is continued in a manner similar to that of the first step and water is removed.

6. The process of claim 1 wherein said carboxylic acids of said first step comprises a mixture of dimeric and trimeric fatty acids, which, optionally, also contains monomeric fatty acids, dicarboxylic acids, and mixtures thereof.

7. The process of claim 1 wherein the amines of said further step, comprises polyfunctional amines.

8. The process of claim 1 wherein the amines of said further step comprise monoamines.

9. The process of claim 1 wherein a plasticiser is added in said further step.

10. The process of claim 9 wherein the plasticiser is selected from the group consisting of benzyl alcohol, dioctyl phthalate, diisopropyl naphthalene, and mixtures thereof.

11. The process of claim 1 wherein the organic solvent is selected from toluene, xylene or mixtures thereof.

12. Polyamide resins prepared by the process of claim 1.

13. The process of claim 5 wherein the amines of said second step comprise polyfunctional amines.

14. The process of claim 5 wherein the amines of said second step comprise monoamines.

15. An adhesion promoter which comprises the polyamide resins prepared in accordance with the process of claim 1.

16. A process for the preparation of polyamide resins having an amine number of 10 to 300 mgKOH/g which comprises reacting amines with carboxylic acids in a multi-step process, wherein the first step of the process comprises reacting a mixture of dimeric and trimeric fatty acids, which optionally also contains a monomeric fatty acid, a saturated monocarboxylic acid, a saturated dicarboxylic acid or mixtures thereof, with a stoichiometric deficiency of polyamine in the presence of an organic solvent which forms an azeotrope with water, distilling water off, and controlling the reaction by means of the amount of water formed by the condensation reaction and, optionally, by the imidazoline formation, and, after removal of the theoretical amount of water or a lesser amount, in a further step, adding additional polyamine to the reaction mixture in an amount sufficient to achieve a final amine number of 10 to 300 mgKOH/g, continuing the reaction until substantially all of the residual water is removed, and completely or partially removing any residual solvent.

17. The process of claim 16 in which the polyamine of the first step is a polyalkylene amine, a piperazine, N-aminoethyl piperazine or an amine derivative of piperazine.

18. A process for the preparation of polyamide resins having an amine number of 10 to 300 mgKOH/g which comprises reacting amines with carboxylic acids in a multi-step process, wherein the first step of the process comprises reacting a mixture of dimeric and trimeric fatty acids, which optionally also contains a monomeric fatty acid, a saturated monocarboxylic acid, a saturated dicarboxylic acid or mixtures thereof, with a stoichiometric deficiency of polyamine in the presence of an organic solvent which forms an azeotrope with water, distilling water off, and controlling the reaction by means of the amount of water formed by the condensation reaction and, optionally, by the imidazoline formation, and, after removal of the theoretical amount of water or a lesser amount, in a further step, adding monoamine to the reaction mixture in an amount sufficient to achieve a final amine number of 10 to 300 mgKOH/g, continuing the reaction until substantially all of the residual water is removed, and completely or partially removing any residual solvent.

19. The process of claim 16 in which the polyamine of the first step is a polyalkylene amine, a piperazine, N-aminoethyl piperazine or an amine derivative of piperazine.

20. The process of claim 19 in which a polyamine is also added in the further step.

* * * * *